(12) United States Patent
Park et al.

(10) Patent No.: US 11,890,826 B2
(45) Date of Patent: Feb. 6, 2024

(54) METHOD OF ENHANCING FOOTWEAR IMPRESSION ON POROUS SURFACES USING POTASSIUM FERROCYANIDE SOLUTION FOR FOOTWEAR IMPRESSION ENHANCEMENT

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Byung Seon Moon, Busan (KR); Jae Mo Goh, Seoul (KR); Jin Pyo Kim, Daejeon (KR); Young Il Seo, Wonju-si (KR); Eun Ah Joo, Wonju-si (KR); Je Hyun Lee, Wonju-si (KR); Yong Jun Kim, Cheonan-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 0 days.

(21) Appl. No.: 17/897,101

(22) Filed: Aug. 26, 2022

(65) Prior Publication Data
US 2023/0405948 A1 Dec. 21, 2023

(30) Foreign Application Priority Data
May 25, 2022 (KR) .......................... 10-2022-0064088

(51) Int. Cl.
*A61B 5/1174* (2016.01)
*B05D 1/02* (2006.01)
(Continued)

(52) U.S. Cl.
CPC ...... *B29C 71/0009* (2013.01); *B29C 44/5627* (2013.01)

(58) Field of Classification Search
CPC ..... A61B 5/1174; B05D 1/02; B29C 44/5627; B29C 59/02; B29C 71/0009; B29C 71/02; G01N 1/30; G01N 2001/302
(Continued)

(56) References Cited

U.S. PATENT DOCUMENTS 6,017,754 A * 1/2000 Chesnut ................. C12N 15/65
435/5

FOREIGN PATENT DOCUMENTS

WO  WO-9963342 A1 * 12/1999 ............... G01N 1/30

OTHER PUBLICATIONS

Farrugia et al., "Chemical enhancement of soil based footwear impressions on fabric," Forensic Science International, Dec. 6, 2011, vol. 219, pp. 12-28.
(Continued)

*Primary Examiner* — Leo B Tentoni
(74) *Attorney, Agent, or Firm* — Hauptman Ham, LLP

(57) ABSTRACT

A method of enhancing a footwear impression formed on a porous surface using a potassium ferrocyanide solution for footwear impression enhancement includes: forming a porous surface sample by leaving footwear impressions into an object having a porous surface; preparing a potassium ferrocyanide solution for footwear impression enhancement; and applying the potassium ferrocyanide solution for footwear impression enhancement to the porous surface sample.

9 Claims, 12 Drawing Sheets
(9 of 12 Drawing Sheet(s) Filed in Color)

(51) Int. Cl.
  *B29C 59/02* (2006.01)
  *B29C 71/02* (2006.01)
  *B29C 71/00* (2006.01)
  *B29C 44/56* (2006.01)

(58) Field of Classification Search
  USPC .......... 264/48, 293, 321, 345; 427/1; 73/863
  See application file for complete search history.

(56) References Cited

OTHER PUBLICATIONS

[Supportive materials for Exception to Loss of Novelty] Kim et al., "Enhancement of two-dimensional foot-impression by using Potassium ferrocyanide," Korean Society of Forensic Sciences 2021 Fall Conference, Nov. 23-30, 2021, Poster Presentation; With English abstract, 4 Pages; In connection with Korean Patent Application No. 10-2022-0064088.

* cited by examiner

FIG. 7F

METHOD OF ENHANCING FOOTWEAR IMPRESSION ON POROUS SURFACES USING POTASSIUM FERROCYANIDE SOLUTION FOR FOOTWEAR IMPRESSION ENHANCEMENT

CROSS-REFERENCE TO RELATED APPLICATIONS

The present application is based on and claims priority to Korean Patent Application No. 10-2022-0064088 filed on May 25, 2022, in the Korean Intellectual Property Office, which is incorporated herein by reference in its entirety.

BACKGROUND

1. Field

One or more embodiments relate to a method of enhancing a footwear impression formed on a porous surface using a potassium ferrocyanide solution for footwear impression enhancement.

2. Description of the Related Art

Footwear impression analysis through the development and enhancement of footwear impressions in criminal cases plays an important role in estimating suspects and their movements.

A planar footwear impression may be formed when soil, dust, etc. originating from the outside is separated from the shoe, or may be formed by applying a human body material such as bloodstain. Planar footwear impressions created at a criminal scene exist on a variety of surfaces, and may be developed and enhanced by physical and chemical techniques.

In a case of planar footwear impressions on porous surfaces, many studies have been made on footwear impressions left as blood and impact marks, whereas studies on the development and enhancement of soil and dust footwear impressions using reagents are insufficient.

A thiocyanate method applied to a porous bright surface has low safety due to toxicity of reagents and solvents used.

The previously reported potassium ferrocyanide method prepares a hydrochloric acid-ethanol solution and a potassium ferrocyanide solution, respectively, and sequentially applies each solution to footwear impressions. According to the conventional technique, it takes time for the maximum reaction to occur (Kevin J. Farrugia et al., 2012).

Accordingly, in order to modify the conventional technique and to diversify techniques for the development and enhancement of footwear impressions more safely and efficiently, it is intended to broaden the selection of techniques for the development and enhancement of footwear impressions by proposing complementary techniques for soil and dust footwear impressions on a porous surface.

[Non-Patent Document] (Non-Patent Document 1) Kevin J. Farrugia et al., "Chemical enhancement of soil based footwear impressions on fabric", Forensic Science International 219 (2012) 12-28

SUMMARY

One or more embodiments include a method of enhancing a footwear impression capable of reducing the use of harmful substances compared to the previously reported potassium ferrocyanide method, and securing the safety of a user in a process of reagent preparing and application.

In addition, one or more embodiments include an efficient method of enhancing a footwear impression capable of shortening a reagent application process and time required.

In addition, one or more embodiments include a method of enhancing a soil and dust footwear impression on a porous surface such as found at a crime scene, thereby diversifying enhancement techniques and expanding the selection of enhancement techniques.

According to one or more embodiments, a method of enhancing a footwear impression formed on a porous surface using a potassium ferrocyanide solution for footwear impression enhancement includes: forming a porous surface sample by leaving footwear impressions into an object having a porous surface; preparing a potassium ferrocyanide solution for footwear impression enhancement; and applying the potassium ferrocyanide solution for footwear impression enhancement to the porous surface sample.

In an embodiment, the preparing of the potassium ferrocyanide solution for footwear impression enhancement may include: preparing an aqueous solution of potassium ferrocyanide by dissolving potassium ferrocyanide in water; and mixing the aqueous solution of potassium ferrocyanide and hydrochloric acid in a certain ratio.

In an embodiment, the applying of the potassium ferrocyanide solution for footwear impression enhancement to the porous surface sample may include: uniformly spraying the potassium ferrocyanide solution for footwear impression enhancement on the footwear impression left on the porous surface; removing harmful gases that may occur in the porous surface sample; and applying heat of an enhancement condition temperature to the porous surface sample for a certain time.

In an embodiment, in the preparing of the aqueous solution of potassium ferrocyanide, the water for dissolving the potassium ferrocyanide may include deionized water.

In an embodiment, in the mixing of the aqueous solution of potassium ferrocyanide and the hydrochloric acid in a certain ratio, a mixing ratio of the aqueous solution of potassium ferrocyanide and the hydrochloric acid may be 1:1 by volume.

In an embodiment, a concentration of the aqueous solution of potassium ferrocyanide may be in the range of 9.5% to 10.5%, and a concentration of the hydrochloric acid may be in the range of 0.9 M to 1.1 M.

Additional aspects will be set forth in part in the description which follows and, in part, will be apparent from the description, or may be learned by practice of the presented embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which:

Figure 7F:
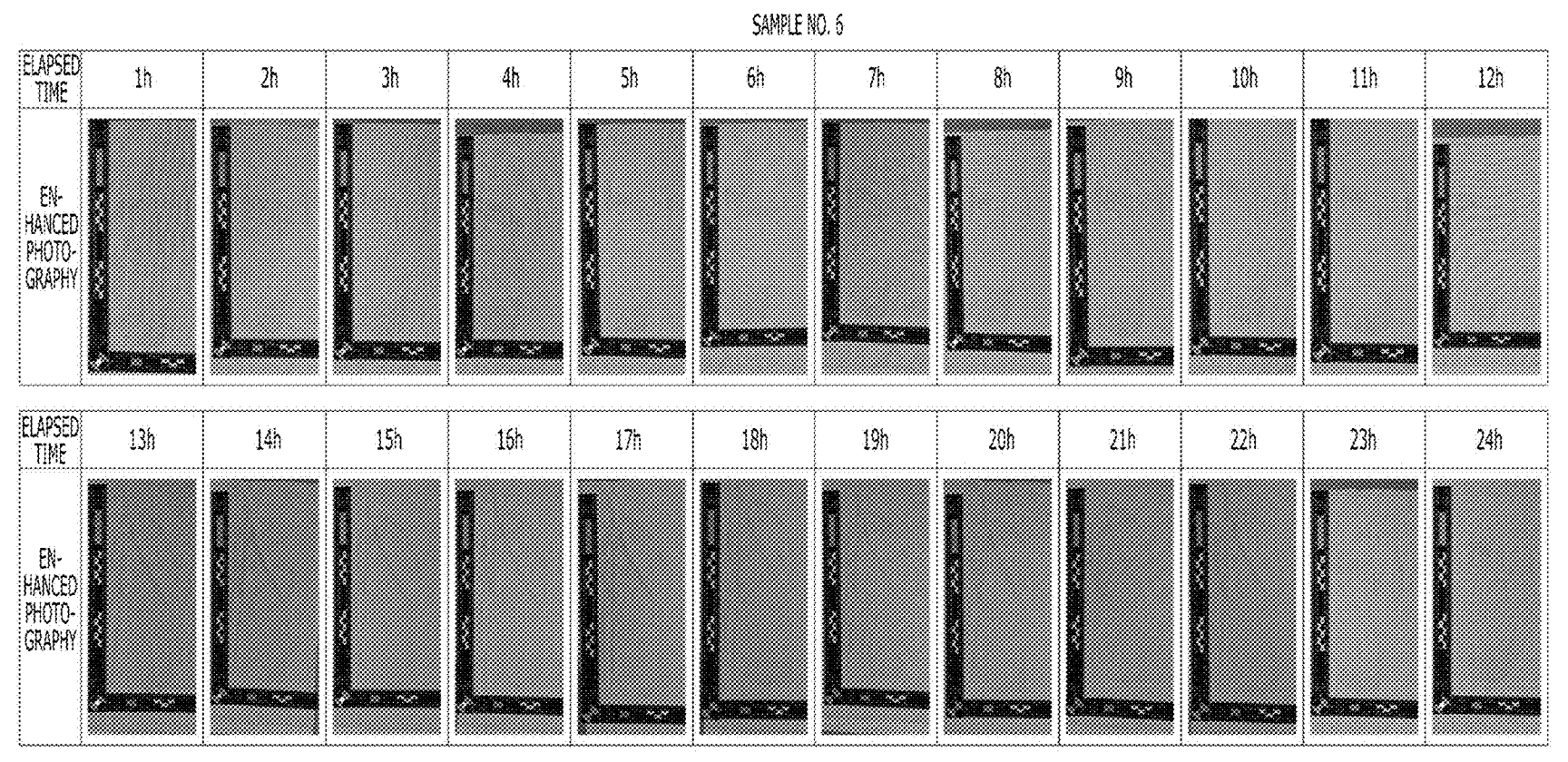

FIGS. 7A to 7F are views illustrating results of enhancing a footwear impression formed by the conventional method with the same sample as in FIG. 6 (Comparative Example).

DETAILED DESCRIPTION

Figure 1:
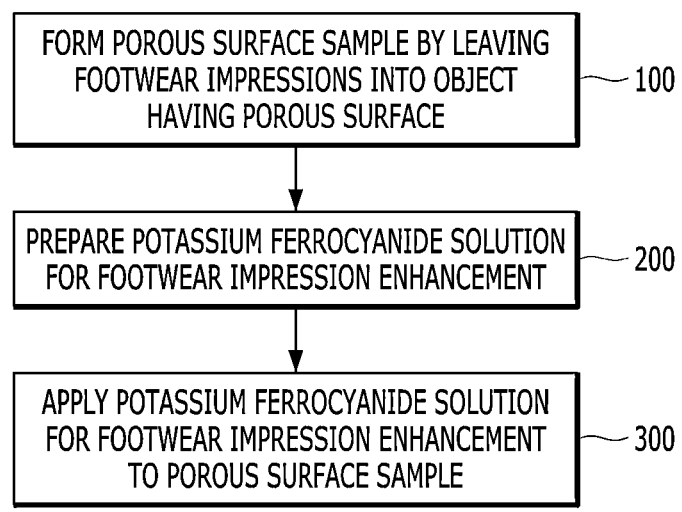
FIGS. 1 to 3 are flowcharts illustrating a method of enhancing a footwear impression formed on a porous surface using a potassium ferrocyanide solution for enhancing a footwear impression according to an embodiment.

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto. When a certain embodiment may be implemented differently, a specific process order may be performed differently from the described order. For example, two consecutively described processes may be performed substantially at the same time or performed in an order opposite to the described order.

As used herein, a 'footwear impression' is a trace left when a person or an animal walks by. At a crime scene, there is a high probability of finding footwear impressions as physical evidence, so an evidence value of the footwear impression is high. 'Enhancement' of the footwear impression refers to increasing a color contrast ratio between a surface and the footwear impression by using a technique using a light source, physical method, or chemical reagent for accurate observation of the footwear impression.

Figure 2:
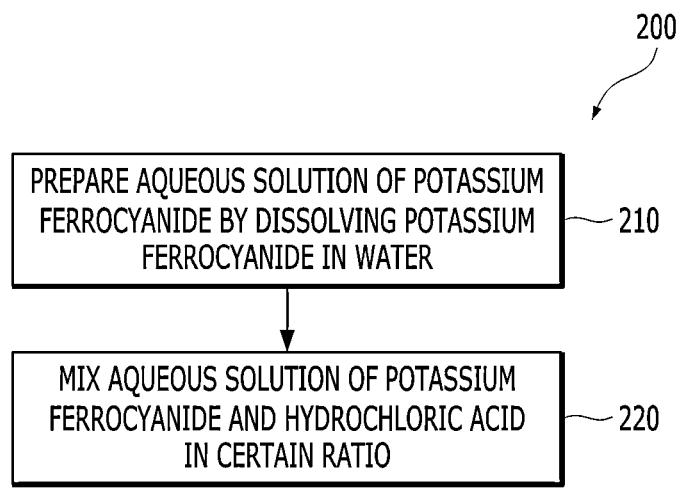
Figure 3:
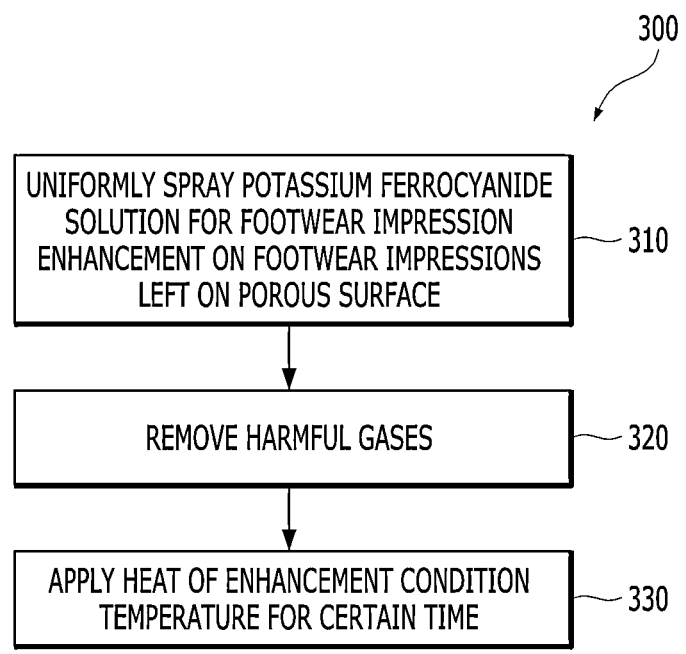

FIGS. 1 to 3 are flowcharts illustrating a method of enhancing a footwear impression formed on a porous surface using a potassium ferrocyanide solution for enhancing a footwear impression according to an embodiment.

Referring to FIGS. 1 to 3, the method of enhancing a footwear impression formed on a porous surface using a potassium ferrocyanide solution for enhancing a footwear impression according to an embodiment is as follows.

Operation 100 is forming a porous surface sample by leaving footwear impressions into an object having a porous surface.

An experimenter puts on shoes and moves while stepping on soil, asphalt, and indoor floors for about 5 to 10 minutes. At this time, the shoes of the experimenter may be stained with soil, dust, etc. to form footwear impressions on a specific object.

For example, clothing is one of objects with a high potential for footwear impressions due to the formation of porous surfaces. The experimenter puts clothing on the floor and puts their weight on them while wearing shoes that are soiled with dirt, etc. and leaves footwear impressions. The clothing may be made of cotton or polyester fibers or the like.

In this case, after selecting a specific shoe sample, and leaving footwear impressions by the same shoe sample on clothing, footwear impression enhancement methods may be compared with each other. In addition, after selecting shoe samples having different shapes and patterns, and leaving footwear impressions on clothing, a footwear impression enhancement experiment may be performed.

Operation 200 is preparing a potassium ferrocyanide solution for footwear impression enhancement.

Operation 200 may include operations 210 and 220.

Operation 210 is preparing an aqueous solution of potassium ferrocyanide by dissolving potassium ferrocyanide in water.

Water used for preparing the aqueous solution of potassium ferrocyanide may include deionized water. It is preferable to use deionized water as water for dissolving potassium ferrocyanide. Deionized water refers to almost pure water from which inorganic salts, organic matter, microorganisms, dissolved gas, etc. have been removed by electrochemical purification of primary treated feed water. The deionized water is water from which internal ions are removed as much as possible, and is used to prevent reactions other than the intended reaction from occurring.

Distilled water is used in the conventional enhancement method using potassium ferrocyanide. Distilled water is water obtained by condensing water by evaporating water.

The aqueous solution of potassium ferrocyanide reacts with iron ions contained in dust or soil contained in a large amount among components of a footwear impression, causing a Prussian blue reaction that changes color to dark blue.

On the other hand, the concentration of the aqueous solution of potassium ferrocyanide is preferably in the range of 9.5% to 10.5%.

Operation 220 is mixing the aqueous solution of potassium ferrocyanide and hydrochloric acid in a certain ratio.

The concentration of the hydrochloric acid to be mixed is preferably in the range of 0.9 M to 1.1 M.

In addition, a mixing ratio of the aqueous solution of potassium ferrocyanide and hydrochloric acid is preferably 1:1 volume ratio, which is the same volume.

When the aqueous solution of potassium ferrocyanide and hydrochloric acid are mixed to prepare a potassium ferrocyanide solution for footwear impression enhancement, the final concentration of hydrochloric acid is within the range of 0.4 M to 0.6 M.

Operation 300 is applying the potassium ferrocyanide solution for footwear impression enhancement to the porous surface sample.

Operation 300 may include the following operations 310, 320, and 330.

Operation 310 is uniformly spraying the potassium ferrocyanide solution for footwear impression enhancement on footwear impressions left on a porous surface.

In operation 310, the potassium ferrocyanide solution for footwear impression enhancement is put in a glass spray container and uniformly sprayed on soil and dust footwear impressions so that all footwear impressions left on clothing are uniformly discolored.

Operation 320 is removing harmful gases that may occur from the porous surface sample.

When the potassium ferrocyanide solution for footwear impression is sprayed on the footwear impression, harmful gases may occur through a chemical reaction with soil or dust in the porous surface sample. At this time, in order to protect an experimenter from volatile harmful substances, a device such as a Hume Hood may be used to remove harmful gases that may occur. While a laboratory room temperature condition is maintained in the fume hood, harmful gases that may occur from the porous surface sample may be removed.

Operation 330 is applying heat of an enhancement condition temperature to the porous surface sample for a certain time.

For example, when the porous surface sample is cotton clothing with footwear impressions, heat at 170° C. to 190° C. may be applied for 10 to 20 seconds using a dry heat iron. In addition, when the porous surface sample is polyester clothing with footwear impressions, heat at 100° C. to 130° C. may be applied for 10 to 20 seconds using a dry heat iron. As such, the enhancement condition temperature is different depending on the type of the porous surface sample.

In this case, by adding paper to clothing where the footwear impression is left, when heat and pressure are applied to the paper with a dry heat iron, an enhanced footwear impression appears on the clothing.

In operation 330, it is necessary to confirm that the experimenter does not over-enhance by applying heat to the porous surface sample. By heating the porous surface sample in this way, the time required to enhance the footwear impression is shortened.

It is possible to observe the shape, size, abrasion, foreign material traces, etc. from the enhanced footwear impression. Soil and dust footwear impressions, which are enhanced by applying a potassium ferrocyanide solution for footwear impression enhancement, lose color contrast with the background as time passes, and need to be photographed within a few hours after appearing.

Hereinafter, the disclosure will be described in more detail by describing Examples, Comparative Examples, and Experimental Examples. However, Examples, Comparative Examples, and Experimental Examples are only examples of the disclosure, and the scope of the disclosure is not limited thereto.

Example 1

Footwear impressions of six shoe samples are left on the surface of a polyester T-shirt. A 10% aqueous solution of potassium ferrocyanide and 1M hydrochloric acid are mixed in the same volume to prepare a potassium ferrocyanide solution for footwear impression enhancement having a final hydrochloric acid concentration of about 0.5 M and applied to the T-shirt where the footwear impressions are left. Using a dry heat iron, heat of approximately 120° C. is applied to the T-shirt where the footwear impressions are left for about 10 to 20 seconds.

Example 2

Footwear impressions of the same six shoe samples as in Example 1 are left on the surface of a cotton T-shirt, and the same potassium ferrocyanide solution for footwear impression enhancement as in Example 1 is prepared and applied to the T-shirt where the footwear impressions are left. Using a dry heat iron, heat of approximately 180° C. is applied to the T-shirt where the footwear impressions are left for about 10 to 20 seconds.

Example 3

Under the same conditions as in Example 1, an enhancement method is applied to footwear impressions of the same six shoe samples as in Comparative Example to be described later.

Comparative Example

Solutions A and B are sequentially sprayed and applied to the footwear impressions of the same six shoe samples as in Example 3 as follows (the conventional enhancement method).

Solution A: A solution containing 35% to 37% hydrochloric acid (10 mL) and ethanol (90 mL)

Solution B: A solution prepared by dissolving potassium ferrocyanide (5 g) in distilled water (100 mL)

Experimental Example 1: Results of Footwear Impression Enhancement of Cotton and Polyester Surfaces According to an Embodiment Examples 1 and 2 are tested according to an improved method of enhancing a footwear impression on a polyester surface and a cotton surface, respectively.

Figure 4:
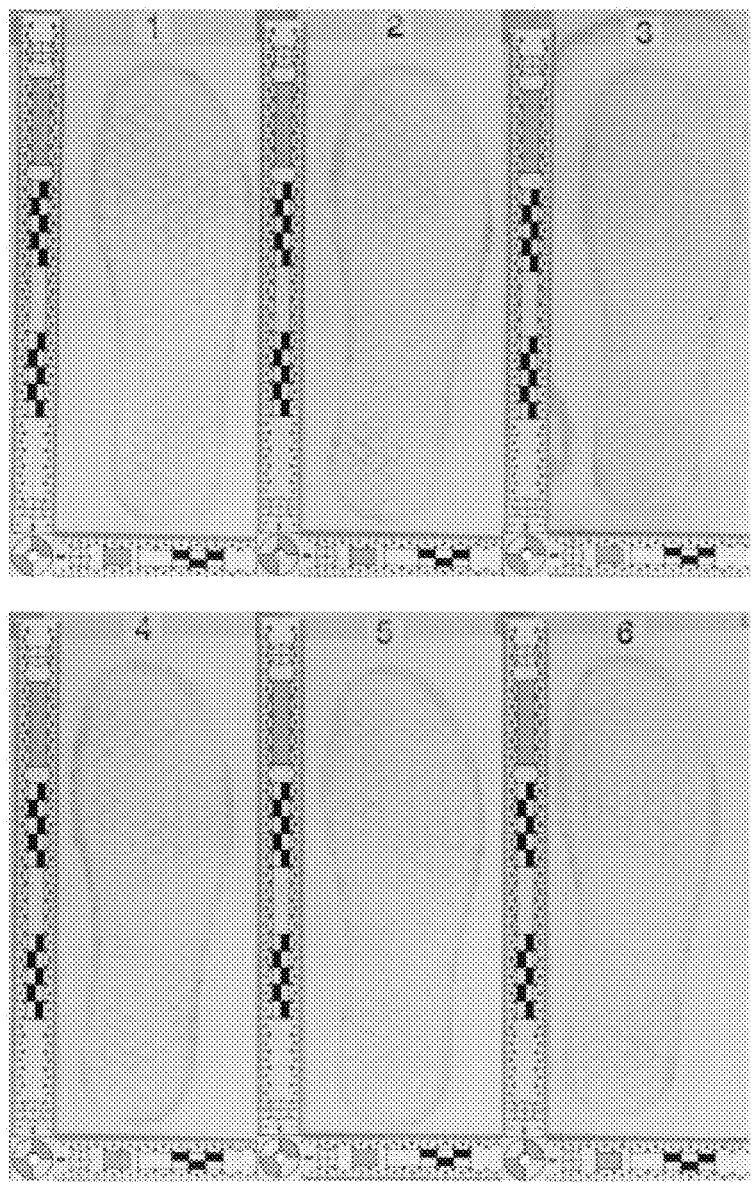
FIG. 4 is a view illustrating a result of enhancing a footwear impression formed on a polyester surface (Example 1) according to the method of FIG. 1.
Figure 5:
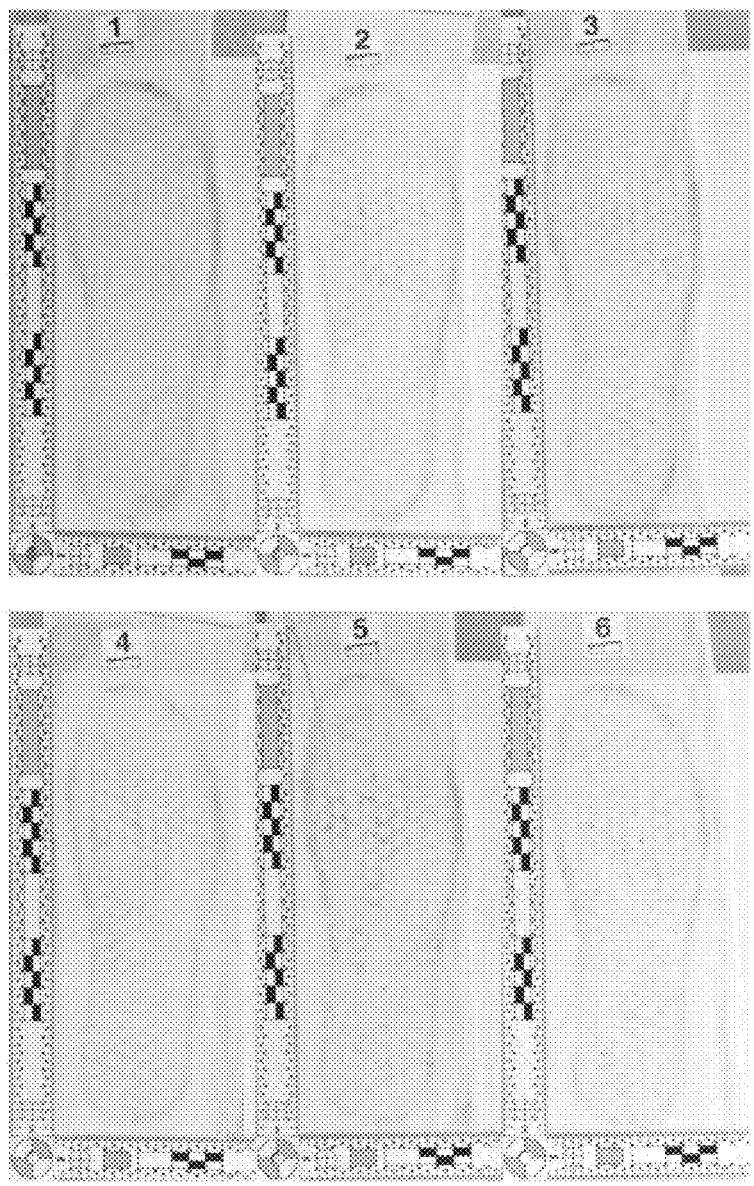
FIG. 5 is a view illustrating a result of enhancing a footwear impression formed on a cotton surface (Example 2) according to the method of FIG. 1.

FIG. 4 is a view illustrating a result of enhancing a footwear impression formed on the polyester surface (Example 1) according to the method of FIG. 1. FIG. 5 is a view illustrating a result of enhancing a footwear impression formed on the cotton surface (Example 2) according to the method of FIG. 1.

Referring to FIGS. 4 and 5, in the footwear impression of the polyester surface, the shape and pattern of a shoe are shown in blue, and in the footwear impression of the cotton surface, the shape and pattern of a shoe are shown in a more spread out form than those in the footwear impression of the polyester surface. Cotton is more absorbent than polyester, so the shape and pattern of a shoe in the footwear impression on the cotton surface are less visible than in the footwear impression of the polyester surface. Accordingly, in Experimental Example 2, which is a subsequent comparative experiment, a result of enhancing the footwear impression formed on the polyester surface is confirmed so that the shape and pattern of a shoe may be observed more clearly.

As described above, soil and dust footwear impressions to which a potassium ferrocyanide solution for footwear impression enhancement is applied are enhanced by turning blue due to a Prussian blue formation reaction (a ferrocyanide ion of potassium ferrocyanide and an iron (III) ion react to form Prussian blue, a blue dye).

The shape, size, abrasion, and foreign material traces of the footwear impressions enhanced with blue color may be observed.

Experimental Example 2: Comparison Between an Improved Method of Enhancing a Footwear Impression and the Conventional Method of Enhancing a Footwear Impression on a Polyester Surface In Example 3 and Comparative Example, experiments are conducted by applying the improved method of enhancing the footwear impression and the conventional method of enhancing the footwear impression, respectively, on the polyester surface.

Figure 6:
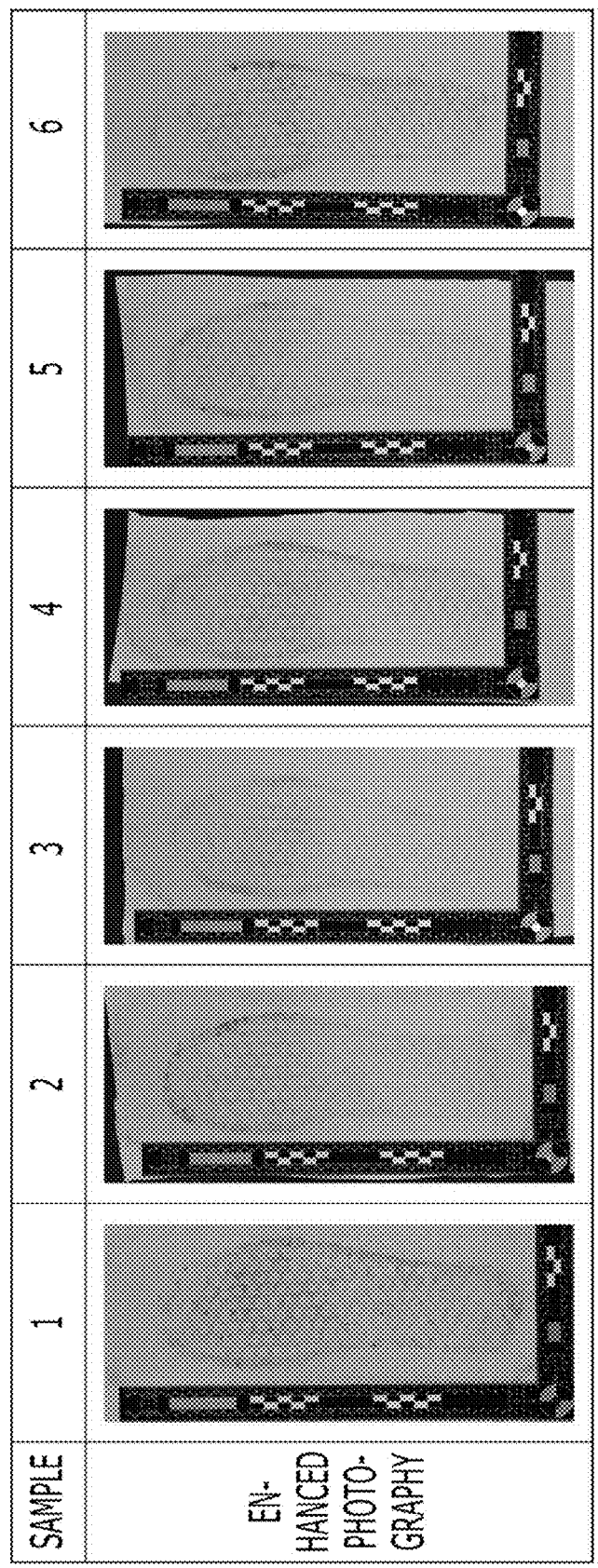
FIG. 6 is a view illustrating a result of enhancing a footwear impression formed with a certain shoe sample (Example 3) according to the method of FIG. 1.
Figure 7A:
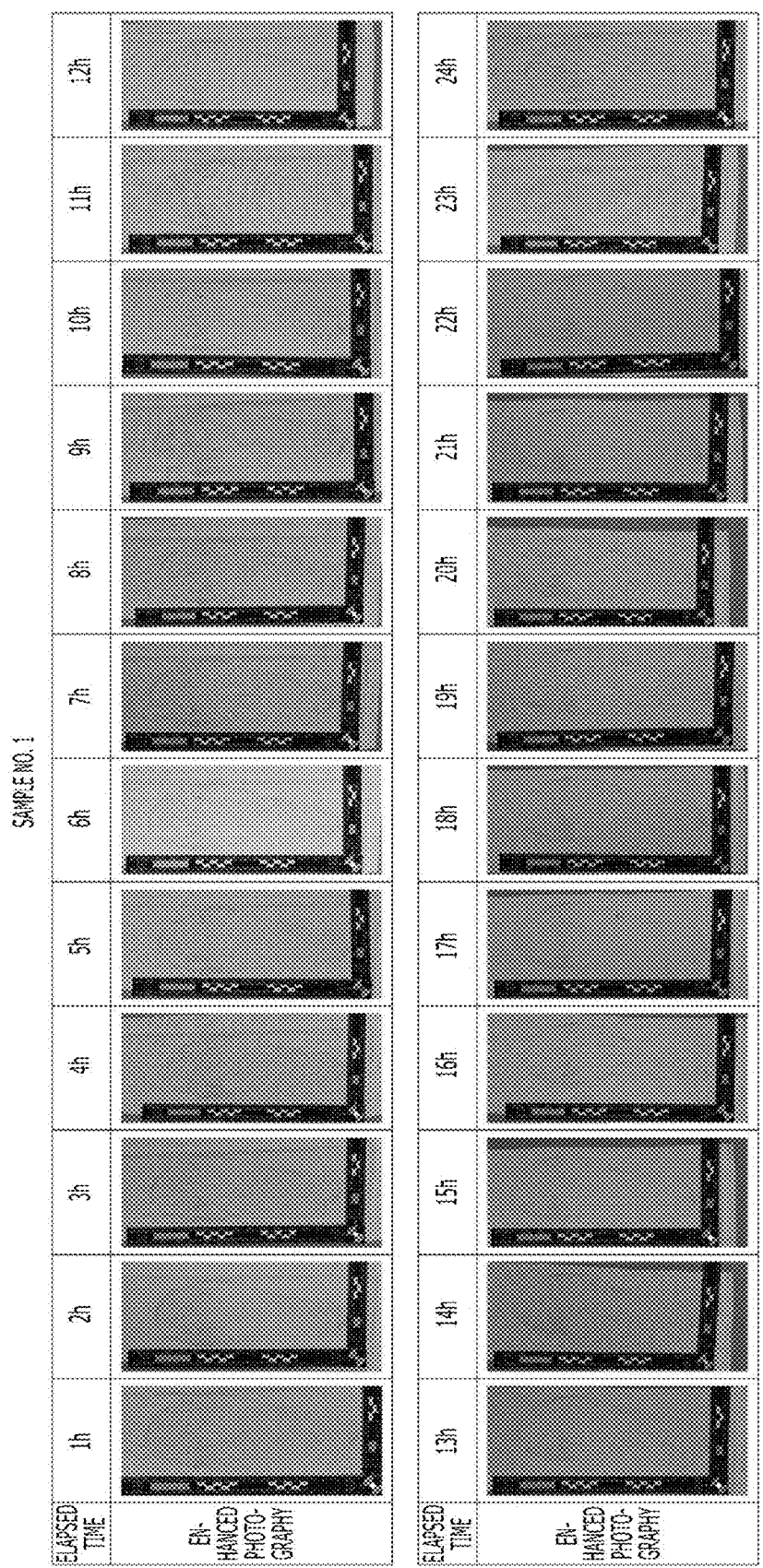
Figure 7B:
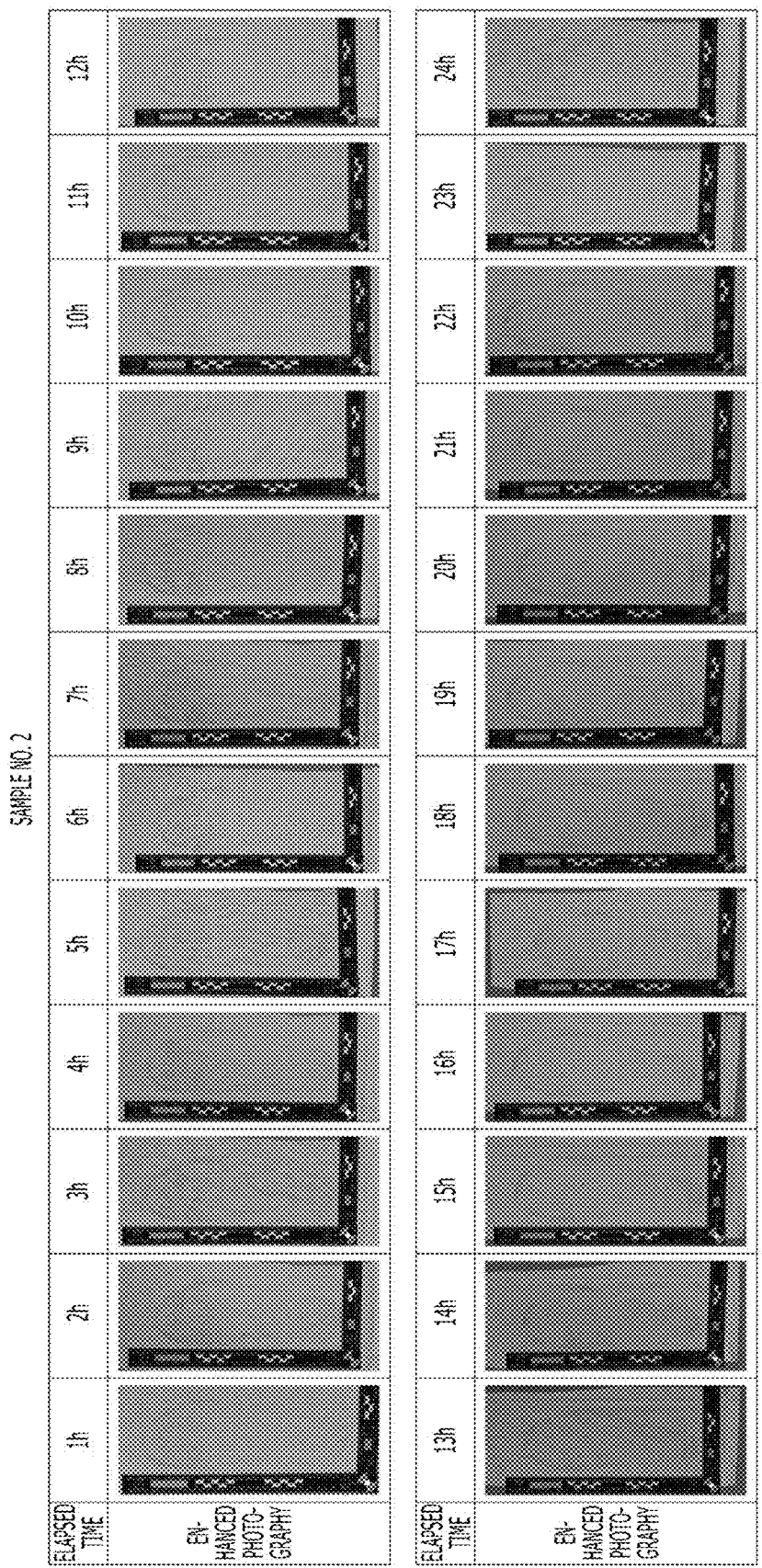
Figure 7C:
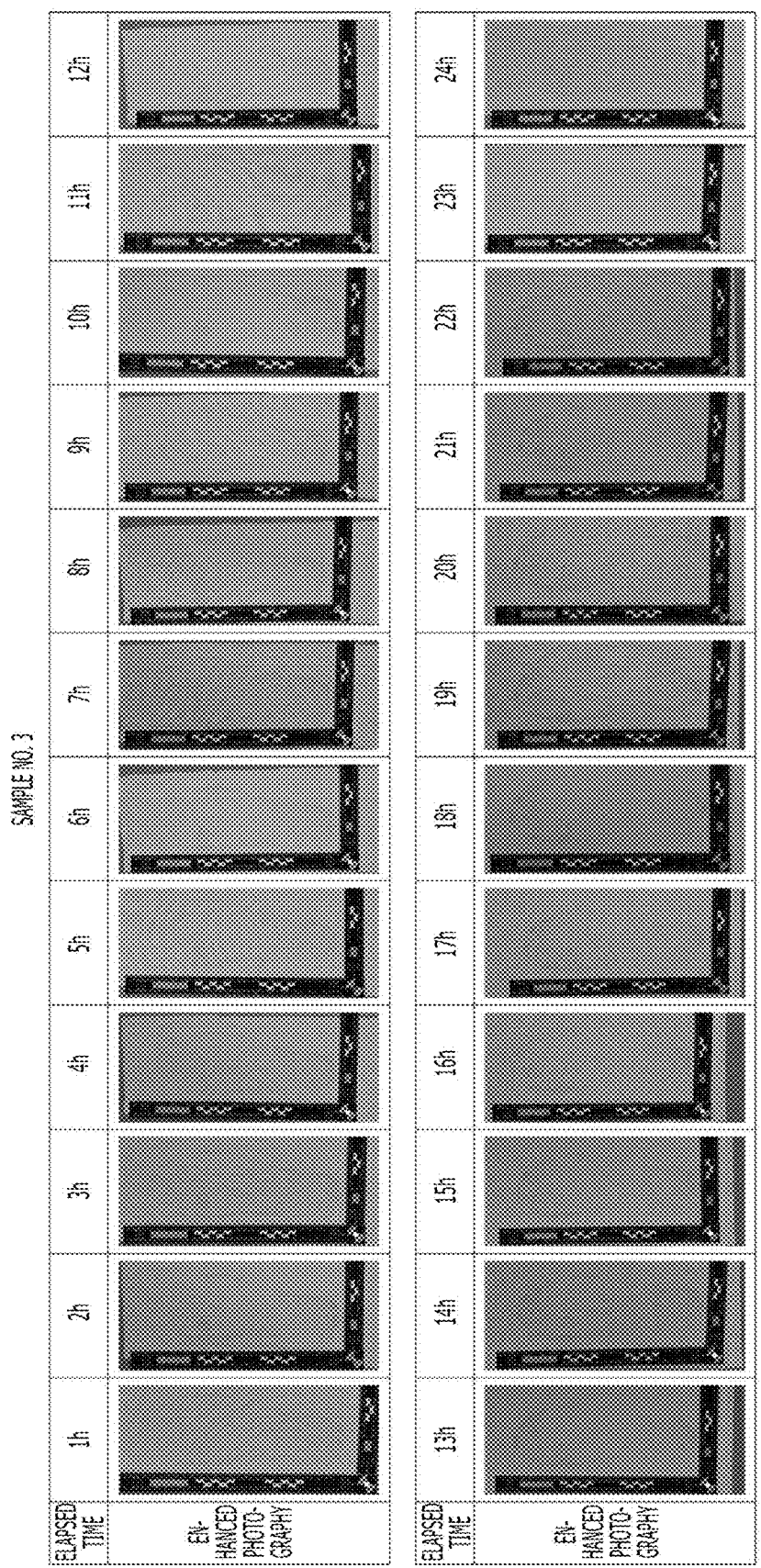
Figure 7D:
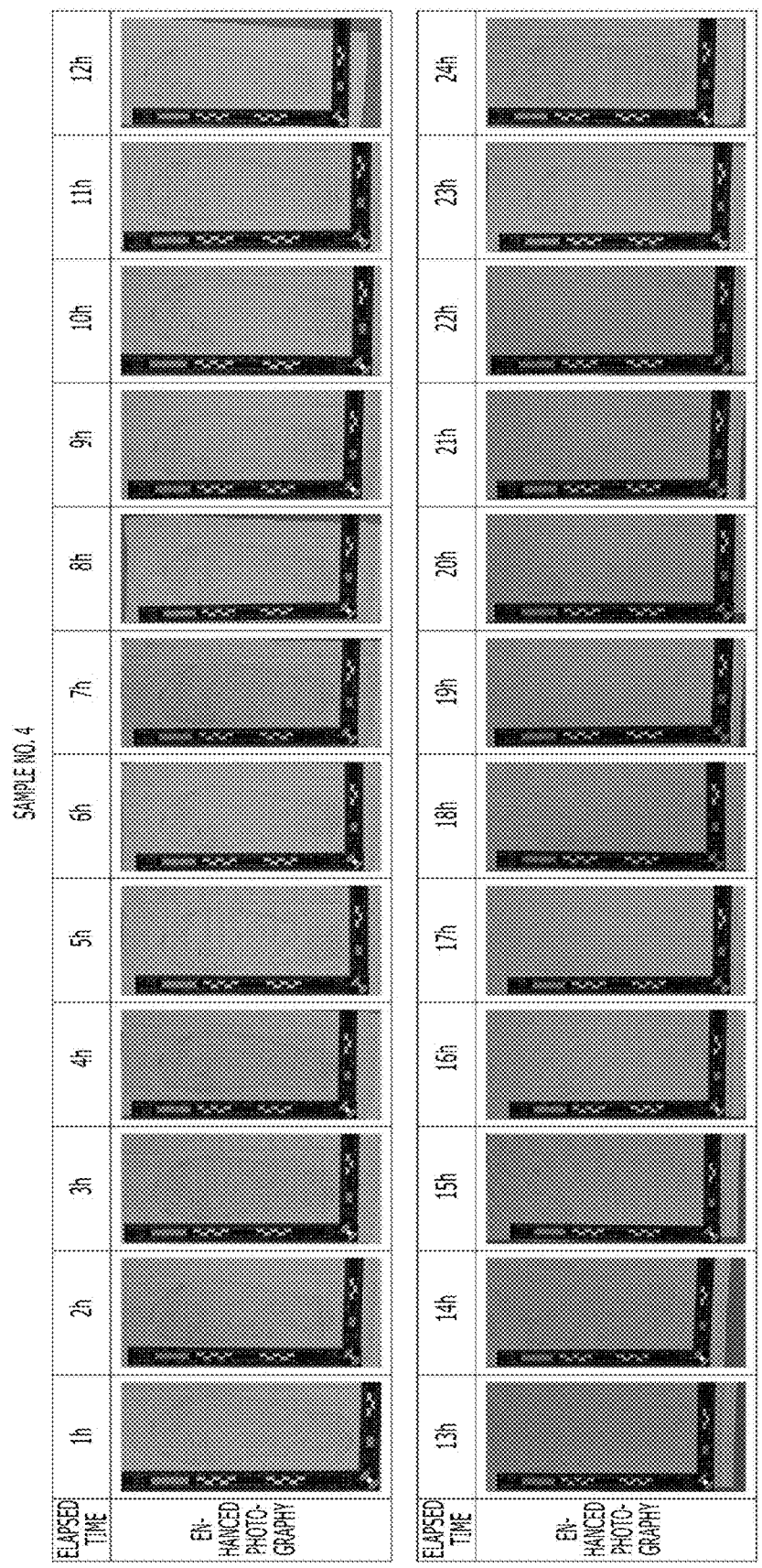
Figure 7E:
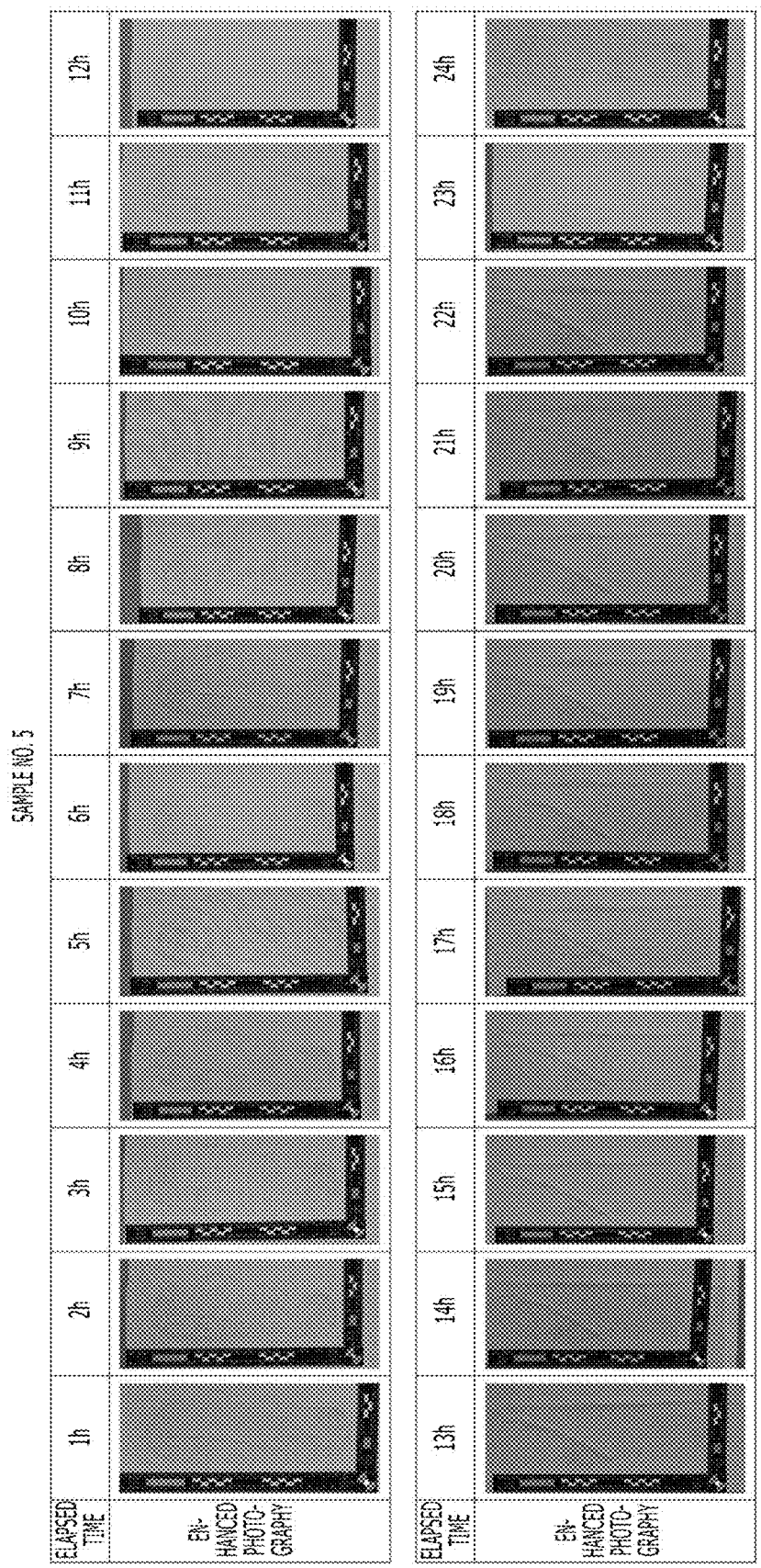

FIG. 6 is a view illustrating a result of enhancing a footwear impression formed with a certain shoe sample (Example 3) according to the method of FIG. 1.

In the case of Example 3, after applying a potassium ferrocyanide solution for footwear impression enhancement to each of footwear impressions formed by shoe samples No. 1 to No. 6, a dry heat iron is preheated and heat of approximately 120° C. is applied for about 10 to 20 seconds. After application of the solution, it takes about 5 minutes to enhance the footwear impression by applying heat, including the dry heat iron preheating time.

FIGS. 7A to 7F are views illustrating results of enhancing a footwear impression formed by the conventional method with the same shoe sample as in FIG. 6 (Comparative Example).

According to the conventional enhancement method, because the enhancement of the footwear impression is continuously performed for 24 hours (Kevin J. Farrugia et al., 2012), a photography of an enhanced state of the footwear impression is taken every hour for 24 hours.

In Comparative Example by the conventional enhancement method, reaction starts to occur immediately after applying the solutions A and B. However, discoloration begins immediately after applying the solutions A and B, so the effect of enhancing footwear impressions immediately after applying the solutions A and B is lower than that of the sample after 1 hour.

Referring to FIGS. 7A to 7F, at least 1 hour has to elapse to determine the effect of enhancing footwear impressions, and it is determined that there is no difference between an enhancement effect after 2 to 3 hours and an enhancement effect after 24 hours to the extent that it is difficult to confirm with the naked eye.

Even after 24 hours have elapsed, the reaction between the footwear impression and the applied solutions continues, and because a reagent reaction also occurs in a background other than the footwear impression, a color contrast ratio between the footwear impression and the background is reduced when a long time elapses.

In the case of Example 3, after applying a potassium ferrocyanide solution for footwear impression enhancement, a maximum enhancement effect may be observed after 10 to 20 seconds have elapsed. However, in the case of Comparative Example by the conventional method, in order to confirm the maximum enhancement effect, at least 2 to 3 hours need to elapse after sequential application of the solutions A and B.

In addition, in the case of Example 3, the hydrochloric acid finally used is about 0.5 M, and in the case of Comparative Example according to the conventional method, the hydrochloric acid finally used is about 1 M. Because the concentration of hydrochloric acid used in the method according to the embodiments (Examples 1 to 3) is low compared to the conventional method, the use of substances harmful to the human body may be reduced.

According to embodiments, by reducing the use of hydrochloric acid, which is a hazardous substance, the safety of an experimenter may be secured by lowering the hazard in a process of preparing and applying a reagent compared to the conventional method.

In addition, according to embodiments, by simplifying a reagent application process and reducing the time required for enhancement, footwear impression enhancement may be efficiently performed.

In addition, according to embodiments, by providing a method for soil and dust footwear impressions on porous surfaces such as found at a crime scene, it is possible to contribute to more effectively solving crime cases by diversifying footwear impression enhancement techniques and expanding opportunities for footwear impression enhancement technique selection.

In addition, according to embodiments, it is possible to contribute to an effective resolution of a criminal case by helping to specify suspect's shoes by identifying group characteristics such as the shape and size of a footwear impression and relatively wide individual characteristics such as wear marks and foreign material traces.

It should be understood that embodiments described herein should be considered in a descriptive sense only and not for purposes of limitation. Descriptions of features or aspects within each embodiment should typically be considered as available for other similar features or aspects in other embodiments. Therefore, the scope of the disclosure is defined by the appended claims.

What is claimed is:

1. A method of enhancing a footwear impression formed on a porous surface using a potassium ferrocyanide solution for footwear impression enhancement, the method comprising:
    forming a porous surface sample by leaving footwear impressions into an object having a porous surface;
    preparing a potassium ferrocyanide solution for footwear impression enhancement, wherein the preparing of the potassium ferrocyanide solution includes mixing an aqueous solution of potassium ferrocyanide and hydrochloric acid; and
    applying the potassium ferrocyanide solution for footwear impression enhancement to the porous surface sample.

2. The method of claim 1, wherein the preparing of the potassium ferrocyanide solution for footwear impression enhancement comprises:
    preparing the aqueous solution of potassium ferrocyanide by dissolving potassium ferrocyanide in water.

3. The method of claim 1, wherein the applying of the potassium ferrocyanide solution for footwear impression enhancement to the porous surface sample comprises:
    uniformly spraying the potassium ferrocyanide solution for footwear impression enhancement on the footwear impression left on the porous surface;
    removing harmful gases that occur in the porous surface sample; and
    applying heat of an enhancement condition temperature to the porous surface sample for a certain time.

4. The method of claim 2, wherein, in the preparing of the aqueous solution of potassium ferrocyanide, the water for dissolving the potassium ferrocyanide comprises deionized water.

5. The method of claim 2, wherein, in the mixing of the aqueous solution of potassium ferrocyanide and the hydrochloric acid in a certain ratio, a mixing ratio of the aqueous solution of potassium ferrocyanide and the hydrochloric acid is 1:1 by volume.

6. The method of claim 2, wherein a concentration of the aqueous solution of potassium ferrocyanide is in a range of 9.5% to 10.5%, and a concentration of the hydrochloric acid is in the range of 0.9 M to 1.1 M.

7. The method of claim 1, further comprising:
    heating the porous surface sample to which the potassium ferrocyanide solution is applied at a temperature of 100° C. or higher.

8. The method of claim 7, wherein the porous surface sample to which the potassium ferrocyanide solution is applied is heated in a range of 100° C. to 130° C. or in a range of 170° C. to 190° C., for 10 seconds to 20 seconds.

9. The method of claim 7, wherein the porous surface sample to which the potassium ferrocyanide solution is applied is heated for 10 seconds to 20 seconds.

* * * * *